United States Patent [19]

Höfert et al.

[11] 3,978,355

[45] Aug. 31, 1976

[54] DAMPING IN ELECTRIC CLOCK

[75] Inventors: Paul Höfert; Roland Sudler, both of Frankfurt am Main, Germany

[73] Assignee: VDO Adolf Schindling AG, Frankfurt am Main, Germany

[22] Filed: Apr. 30, 1975

[21] Appl. No.: 573,343

[30] Foreign Application Priority Data

May 3, 1974 Germany ........................... 2421367

[52] U.S. Cl. .................................. 310/74; 310/191; 310/209; 58/23 D

[51] Int. Cl.² ........................................... H02K 7/02

[58] Field of Search ................. 310/74, 75, 78, 191, 310/209, 156, 190; 58/23 D, 28

[56] References Cited

UNITED STATES PATENTS 1,283,433 10/1918 Warren ............................ 310/78 X

*Primary Examiner*—Donovan F. Duggan
*Attorney, Agent, or Firm*—Otto John Munz

[57] ABSTRACT

A damping chamber in an electric clock is provided with a closure surface which conforms to a closure surface on the shaft of the electric motor which drives the clock. The permanent-magnet rotor of the motor is displaced from the stator in a direction away from the damping chamber so that, when the stator is driven, it will generate a force component on the rotor which will force the shaft to increase the pressure on the closure surfaces, thereby improving the seal of the damping chamber when the motor is operated.

6 Claims, 2 Drawing Figures

DAMPING IN ELECTRIC CLOCK

BACKGROUND OF THE INVENTION

1. Field of the Invention

The invention relates to an electric clock, particularly a quartz-crystal controlled clock, having an electric motor, especially a single-phase stepping motor, with a permanent-magnet rotor whose shaft is supported at each end of the shaft and at one end protrudes into a damping chamber filled with a damping liquid.

2. Description of the Prior Art

In electric clocks, especially in quartz clocks, an almost noiseless running of the clock is frequently required. The fulfillment of this requirement is particularly difficult in clocks with a stepping motor. A relatively high noise level prevails in such clocks because of the jerky advance of the rotor and the overswing occurring at the end of each rotor step, which interacts with the play between the individual gears of the hand mechanism driven by the motor.

It is already known to place one end of the motor shaft in a damping chamber filled with a damping liquid in order to lower the noise level. Thus the noise level can be considerably lowered. However, since damping liquids of a comparatively low viscosity must be used because of the generally small starting torque of the stepping motors which are usually employed, considerable difficulties occur in the packing of the damping chamber at the entrance of the shaft. Tests with customary packing agents have hitherto not led to a satisfactory result. In a discharge-proof packing, the friction occurring between packing and shaft would be too great, and in a packing with small frictional forces acting upon the shaft, it would not be possible safely to prevent a discharge of the damping liquid.

SUMMARY OF THE INVENTION

These difficulties are overcome by the present invention. The invention provides packing agents for the damping chamber which achieve a fully satisfactory packing effect while affecting the running of the motor as little as possible. Moreover, these measures are of low expense and of small structural volume.

The invention provides the shaft, in the area of the damping chamber opening, with a closure surface and displaces the rotor axially in the stator so that, in any operating condition of the motor, an axial force produced by the magnetic field acts upon the shaft in the direction toward the damping chamber.

The axial force produced by the axial displacement of the rotor in the stator depends upon the state of rest of the motor. That is to say, when the stator is currentless, the force depends essentially upon the extent of the rotor displacement, but in operation, that is to say when current passes through the stator, the force depends upon the rotor displacement and the excitation which exerts upon the rotor both the torsional force thereof and also an axial force opposed to the axial force produced by the rotor displacement. This axial force, opposed to the axial force produced by the rotor displacement, compensates for the axial force produced by the rotor displacement. Whether it partly or completely compensates depends upon the magnitude of the latter. A suitable rotor displacement therefore permits a packing that is reliable in any operational state of the motor while affecting the running of the motor to an extremely slight degree. A particular advantage of the device of the invention is that no additional structural elements whatsoever are necessary and the structural volume of the system consisting of motor and damping chamber is either not enlarged or only slightly enlarged.

Since in known motors either the lengths of the rotor and the stator are about equal or the length of the stator is somewhat greater than that of the rotor, an axial displacement of the rotor would generally lead to a decrease of the motor torque. This disadvantage which exists especially in motors having a small torque in the first place can, according to a further concept of the invention advantageously be eliminated by choosing a greater length for the rotor than for the stator. A length of the rotor approximately twice the length of the stator has proved particularly suitable. A reasonable variation might be for the rotor to be one and a third to two and a half times the length of the stator. In this case an axial force is obtained which is sufficient for the packing in any state of operation of the motor, while the torque remains at a maximum value.

For accomplishing strong damping and thus small noise generation, it is most suitable to provide the portion of the shaft that protrudes into the damping chamber with a rectangular cross section.

In a preferred embodiment the closure surface is formed by screwing onto the shaft a pin which protrudes into the damping chamber, in which structure the damping chamber has a smaller diameter than the shaft. The closure of the damping chamber takes place in this case by means of the annular front surface of the shaft which extends between the starting point of the pin and the shaft surface. Such an embodiment, in contrast to other possibilities of embodiment, such as a collar provided on the shaft, is particularly space-saving and can be manufactured with a minimum of material waste.

A further lowering of the noise level can advantageously be achieved, in a development of the embodiment described, by providing between pin and shaft a cone-like transition piece and providing the damping chamber with a cone-like opening against which the transition piece abuts. By this means the noises caused by the bearing play of the shaft can be almost completely eliminated.

DESCRIPTION OF THE PREFERRED EMBODIMENTS

Figure 1:
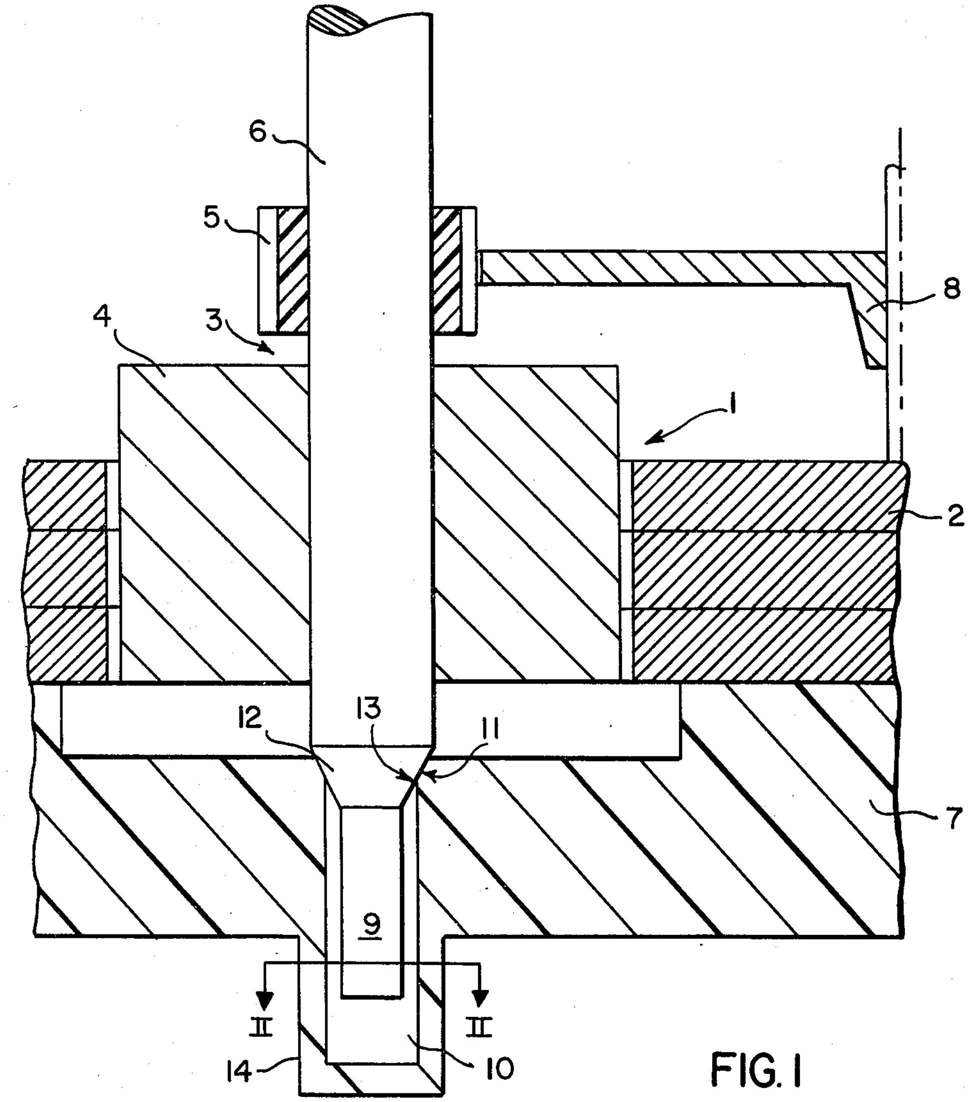
FIG. 1 shows, partly in diagram, a section through a single-phase stepping motor installed in a clock.
Figure 2:
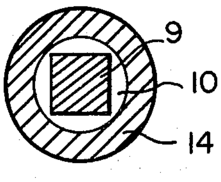
FIG. 2 is a cross-sectional view of a cup, chamber and pin of FIG. 1.

A single-phase stepping motor 1, shown on an enlarged scale, consists of a laminated stator 2 and a rotor 3 with a multipolar permanent magnet 4 which is mounted, jointly with a pinion 5, on the rotor shaft 6. Stator 2 is fastened on a hand-mechanism plate 7. In this and another hand mechanism plate (not shown), parallel to the first, rotor shaft 6 and the shaft of the second hand 8 which meshes with pinion 5 are supported. The other gears of the hand mechanism, like the other mechanical electrical and electronic parts of the clock are not shown for the sake of clarity.

Rotor shaft 6 protrudes with a pin 9 into a damping chamber 10 molded as a cup 14 into the plasticmaterial hand-mechanism plate 7. The diameter of the damping chamber 10 is smaller than that of shaft 6, and the damping chamber 10 is filled with a silicon oil of medium viscosity. Damping chamber 10 has a cone-shaped opening 11 against which a cone-shaped transition piece 12 screwed onto rotor shaft 6 abuts. This transition piece 12, with its surface 13, forms the closure of damping chamber 10. The necessary tightness of the closure is achieved by means of an axial displacement of permanent magnet 4 with respect to stator 2. The length of permanent magnet 4, as shown, is greater than that of stator 2, in order to avoid a decrease of torque. By this displacement of the permanent magnet, an axial force caused by the magnetic field is produced which pushes shaft 6 in the direction toward damping chamber 10 and thus presses the conical transition piece 12 into the conical damping chamber opening 11.

What is claimed is:

1. In an electric clock having an electric motor with a stator and a permanent-magnet rotor mounted on a shaft, the shaft being supported at each end and having one end protruding into a damping chamber filled with a damping liquid, the improvement comprising:

A. closure surfaces formed on the shaft and on the chamber, and

B. means for mounting the rotor on the shaft in a position which is axially displaced from a position of symmetry with respect to the stator in a direction away from the closure surface, and C. means, operable in any state of operation of the motor in which the stator acts magnetically on the rotor, for causing the stator to generate a component of force on the rotor in a direction which forces the shaft toward the chamber and for thereby effecting a tighter seal of the closure surfaces on the shaft and the chamber.

2. An electric clock as in claim 1, wherein the length of the rotor is greater than that of the stator.

3. An electric clock as in claim 2, wherein the length of the rotor is about twice the length of the stator.

4. An electric clock as in claim 1 wherein the portion of the shaft that protrudes into the damping chamber has a rectangular cross section.

5. An electric clock as in claim 1, wherein the closure surface of the shaft is formed by screwing a pin protruding into the damping chamber onto the shaft, and in which structure the damping chamber has a smaller diameter than the shaft.

6. An electric clock as in claim 5, wherein a cone-like transition piece is provided between the pin and the shaft, and the damping chamber has a cone-like opening against which the transition piece abuts.

* * * * *